United States Patent
Tanaka

(10) Patent No.: US 7,047,747 B2
(45) Date of Patent: May 23, 2006

(54) METHOD OF AND DEVICE FOR CONTROLLING FUEL FOR GAS TURBINE

(75) Inventor: Satoshi Tanaka, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 483 days.

(21) Appl. No.: 10/279,073

(22) Filed: Oct. 24, 2002

(65) Prior Publication Data

US 2003/0093184 A1  May 15, 2003

(30) Foreign Application Priority Data

Nov. 13, 2001  (JP) ............................ 2001-348025

(51) Int. Cl.
F02C 3/22 (2006.01)
F02C 9/26 (2006.01)

(52) U.S. Cl. .................. 60/773; 60/39.281; 60/39.465
(58) Field of Classification Search ............ 60/39.281, 60/39.465, 773
See application file for complete search history.

(56) References Cited

U.S. PATENT DOCUMENTS 4,716,719 A  1/1988 Takahashi et al.
5,272,637 A  12/1993 Urushidani et al.
5,899,073 A * 5/1999 Akimaru .................. 60/39.465
6,901,735 B1 * 6/2005 Lohn ........................ 60/39.465

FOREIGN PATENT DOCUMENTS

| DE | 195 18 634 | 10/1995 |
| EP | 0 377 292 | 7/1990 |
| EP | 0 661 426 | 7/1995 |
| JP | 11-236824 | 8/1999 |

OTHER PUBLICATIONS

Patent Abstracts of Japan, JP 61-205340, Sep. 11, 1986.

* cited by examiner

Primary Examiner—Louis J. Casaregola
(74) Attorney, Agent, or Firm—Oblon, Spivak, McClelland, Maier & Neustadt, P.C.

(57) ABSTRACT

Values such as a pressure for supplying fuel gas to a gas turbine, a pressure in a combustor casing of the gas turbine, an output of a generator connected to the gas turbine, and a controlled output for a flow rate control valve are detected by sensors. The detected values are input into a control device. A differential pressure across the flow rate control valve and a target value of the differential pressure are also input into the control device. The control device performs a desired arithmetic operation based on these input values to output a lift instruction for a pressure control valve.

3 Claims, 5 Drawing Sheets

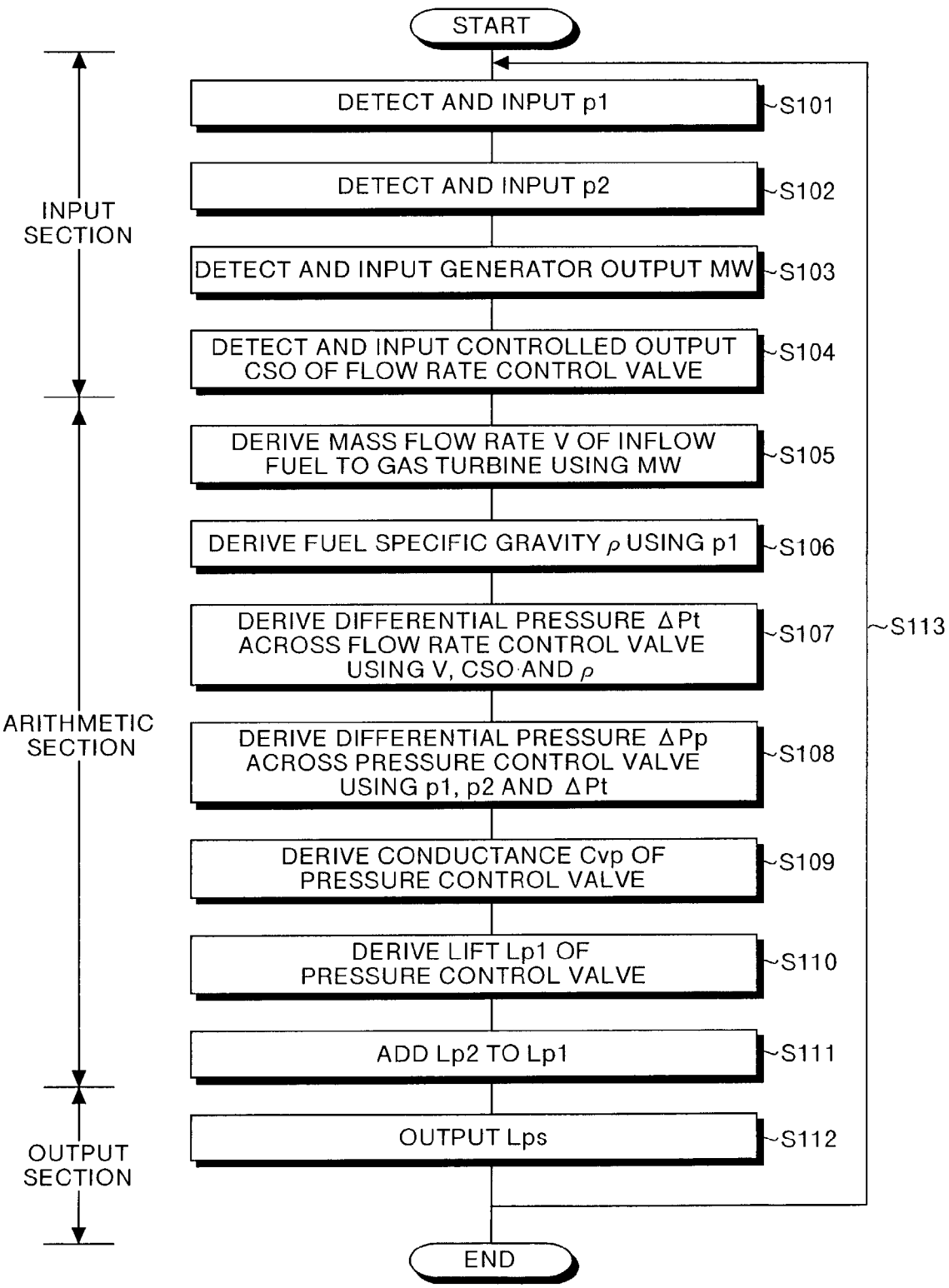

METHOD OF AND DEVICE FOR CONTROLLING FUEL FOR GAS TURBINE

BACKGROUND OF THE INVENTION

1) Field of the Invention

The present invention relates to a technology for controlling fuel for a gas turbine by reflecting changes in a pressure of a gas turbine combustor, an output of a generator, and a controlled output for a flow rate control valve, on a lift amount of a pressure control valve.

2) Description of the Related Art

FIG. 5 is a block diagram showing a conventional method of controlling fuel for a gas turbine. A piping 52 that supplies fuel to a gas turbine 51, is provided in an area from a fuel control source 53 to the gas turbine 51. This piping 52 is provided with a temperature control valve 54, a pressure control valve 55, and a flow rate control valve 56. These valves adjust the flow rate of the fuel that flows in the piping 52. The temperature control valve 54 serves to keep fuel temperature constant. The pressure control valve 55 serves to control a differential pressure. This is because the flow rate control valve 56 can be optimally controlled when the differential pressure between the upstream and downstream sides of the flow rate control valve 56 is constant. The flow rate control valve 56 serves to throttle the flow rate of the fuel.

The temperature control valve 54 is controlled by feedback control. That is, a subtracter obtains a deviation between a temperature target value 57 for fuel gas supply and a fuel gas temperature after the fuel gas is heated by a heater 58. The deviation is subjected to processing by a proportion/integral (PI) controller 59 to obtain a controlled output. The lift amount of the temperature control valve 54 is controlled based on the controlled output. Likewise, the pressure control valve 55 is controlled by feedback control. That is, the deviation between a target value 60 of a differential pressure across the flow rate control valve 56 and an actual differential pressure across the flow rate control valve 56 is obtained. The deviation is subjected to processing by a proportion/integral/differential (PID) controller 61 to thereby control lift.

Similarly, the flow rate control valve 56 is controlled by feedback control. That is, a deviation between a load target value 63 of a generator 62 ("generator load target value") connected to the gas turbine 51 and an actual load 64 of the generator is obtained. The deviation is subjected to processing by a PID controller 65. The resultant deviation is converted to a lift amount of the flow rate control valve 56 using desired conversion functions Fx1 (denoted by reference symbol 66) and Fx2 (denoted by reference symbol 67) to thereby control lift.

The conventional art, however, has the following disadvantages. If supply gas pressure greatly changes, the differential pressure across the flow rate control valve 56 changes for a while. In addition, if the output (load) of the generator 62 suddenly falls, the flow rate control valve 56 is throttled. However, there is a time difference between the fall of the output of the generator 62 and the throttling of the flow rate control valve 56. During this time, the consumed quantity of the fuel gas in the downstream side of the flow rate control valve 56 decreases, resulting in a phenomenon that the pressure of the fuel rises downstream of the flow rate control valve 56 and the differential pressure across the flow rate control valve 56 rapidly increases.

A change in the differential pressure across the flow rate control valve 56 means a change in the heat input to the gas turbine 51. If the input heat changes, then the combustion of a combustor becomes unstable, and combustion vibration may occur to cause the combustor to be broken.

SUMMARY OF THE INVENTION

It is an object of the present invention to provide a method of and device for controlling fuel for a gas turbine capable of appropriately controlling a pressure control valve even if heat input into the gas turbine is changed or the like, and a program which causes a computer to execute the fuel control method.

The gas turbine fuel control method according to one aspect of this invention includes controlling a lift amount of a pressure control valve provided at a piping in which fuel for a gas turbine flows, by feeding back an actually obtained differential pressure across a flow rate control valve also provided at the piping to the pressure control valve and making the differential pressure follow a desired target value of the differential pressure. The gas turbine fuel control method also includes expressing a conductance of the pressure control valve using at least one of a pressure used to supply fuel gas that is detected upstream of the pressure control valve at the piping, a pressure in a combustor casing of the gas turbine, an output of a generator connected to the gas turbine, and a controlled output for the flow rate control valve that is operated based on a difference between an output target value of the generator and an actual output of the generator. The method further includes obtaining an additional lift amount of the pressure control valve from a relationship between the conductance of the pressure control valve and lift, and adding the additional lift amount of to the lift amount.

The gas turbine fuel control method according to another aspect of this invention includes controlling a lift amount of a pressure control valve provided at a piping in which fuel for a gas turbine flows, by feeding back an actually obtained differential pressure across a flow rate control valve also provided at the piping to the pressure control valve and making the differential pressure follow a desired target value of the differential pressure. The gas turbine fuel control method also includes obtaining amass flow rate of inflow fuel to the gas turbine ("gas turbine inflow fuel mass flow rate") that is derived from a relationship with an output of a generator ("generator output") connected to the gas turbine, and obtaining specific gravity of the fuel by multiplying a pressure for fuel gas supply detected upstream of the pressure control valve by a proportional constant for a relationship between the pressure of the fuel gas supply and the specific gravity of the fuel. The method further includes obtaining the differential pressure across the flow rate control valve by multiplying a square of the mass flow rate by the specific gravity of the fuel to obtain a product, and dividing the product by a square of a conductance of the flow rate control valve which is obtained from a controlled output for the flow rate control valve using a function between the controlled output for the flow rate control valve and the conductance of the flow rate control valve, the controlled output being operated based on a difference between an output target value of the generator and an actual output of the generator. The method further includes obtaining a conductance of the pressure control valve by dividing a product between the mass flow rate and a square root of the fuel specific gravity, by a square root of a differential pressure across the pressure control valve ("pressure control valve differential pressure"), the square root of the differential pressure being expressed by subtracting a pressure in a combustor casing of the gas turbine from the pressure for the fuel gas supply to obtain a pressure and further subtracting the differential pressure from the obtained pressure. The method also includes determining an additional lift amount of the pressure control valve using a function between the conductance of the pressure control valve and lift, and adding the additional lift amount of to the lift amount.

The program according to still another aspect of this invention causes a computer to execute any of the gas turbine fuel control methods.

The program is used to control the targeted pressure control valve and the fuel for the gas turbine using a computer as a hardware resource. This program forms one element of the computer by a storage that is used in the computer or by a storage medium such as a flexible disk, and functions to input data, perform various arithmetic operations, and to output data. It is thereby possible to realize the gas turbine fuel control method using the computer.

The gas turbine fuel control device according to still another aspect of this invention controls a lift amount of a pressure control valve provided at a piping in which fuel for a gas turbine flows, by feeding back an actually obtained differential pressure across a flow rate control valve also provided at the piping to the pressure control valve and making the differential pressure follow a desired target value of the differential pressure. The gas turbine fuel control device includes an input unit that inputs, as electric signals, values of a pressure for fuel gas supply that is detected upstream of the pressure control valve at the piping, a pressure in a combustor casing of the gas turbine, an output of a generator connected to the gas turbine, and a controlled output for the flow rate control valve that is operated based on a difference between an output target value of the generator and an actual output of the generator. The control device also includes an arithmetic unit that obtains a conductance of the pressure control valve based on the values of the electric signals input to the input unit, obtains an additional lift amount of the pressure control valve from a relationship between the conductance of the pressure control valve and lift, and obtains a sum of the lift amount and the additional lift amount, and an output unit that outputs the sum as an electric signal.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2A and FIG. 2B are explanatory views which explain a control device, wherein FIG. 2A is a functional block diagram of the control device and FIG. 2B is a block diagram showing hardware of the control device, FIG. 3 is a flowchart that shows a method of controlling a pressure control valve.

DETAILED DESCRIPTIONS

Embodiment of the present invention will be explained in detail below with reference to the accompanying drawings. It should be noted that the present invention is not limited by the embodiment to be explained. It should be also noted that the constituent elements of this embodiment involve constituent elements that a person skilled in the art can easily replace, or those which are substantially equal.

Figure 1:
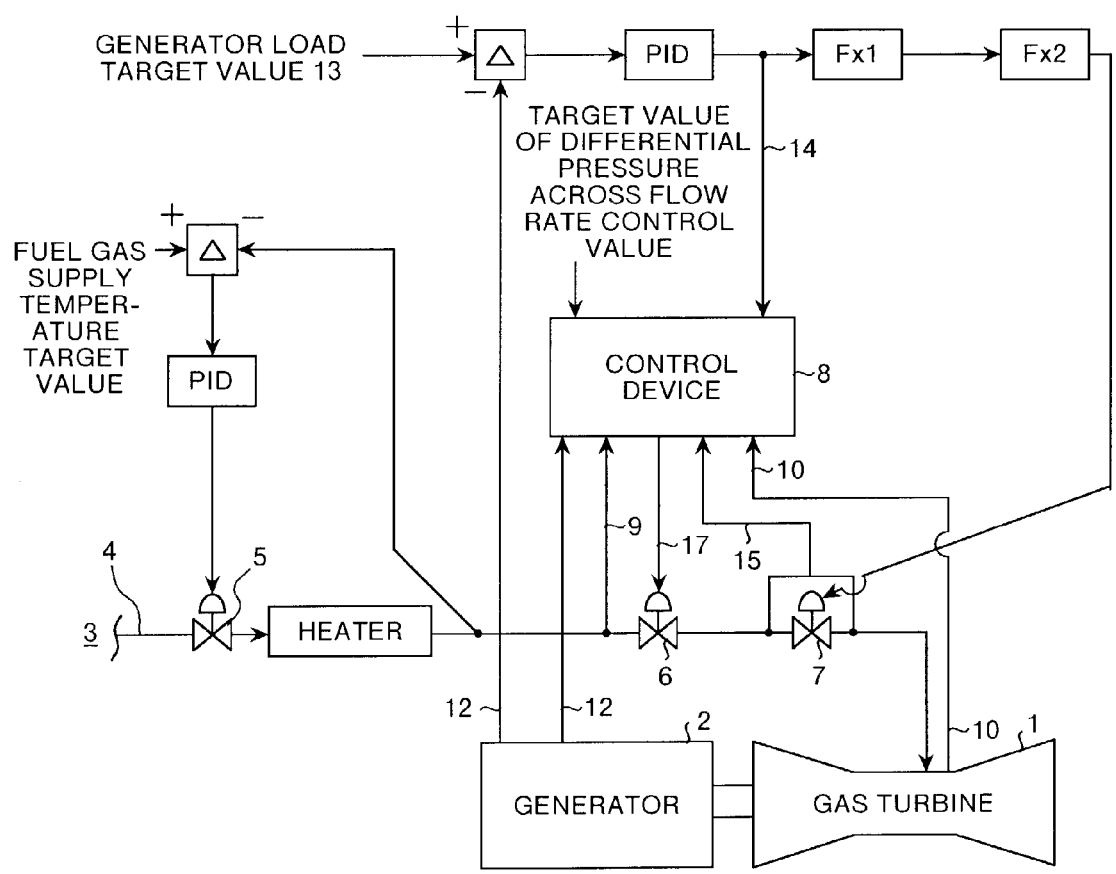
FIG. 1 is a schematic diagram that shows a method of controlling a flow rate of fuel for a gas turbine according to an embodiment of the present invention.

FIG. 1 is a schematic diagram which shows a method of controlling a flow rate of fuel for a gas turbine in an embodiment of the present invention. This embodiment is the same as the conventional art in that a generator 2 is connected to a gas turbine 1, a piping 4 is provided in an area from a fuel supply source 3 to the gas turbine 1, and the piping 4 is provided with valves such as a temperature control valve 5, a pressure control valve 6, and a flow rate control valve 7. Therefore, the equivalent constituent elements will not be explained herein. Further, since the control methods of controlling the temperature control valve 5 and the flow rate control valve 7 are the same as those of the conventional art, the methods will not be explained herein.

The embodiment of the present invention has its feature in a method of controlling the pressure control valve 6. Specifically, a sensor detects a pressure 9 used to supply fuel gas ("fuel gas supply pressure") which is detected upstream of the pressure control valve 6 provided at the piping 4, a pressure 10 in a combustor casing ("combustor casing pressure") of the gas turbine 1, an output 12 of a generator connected to the gas turbine 1, and a controlled output 14 for the flow rate control valve 7 which is operated based on the difference between a target value 13 of a generator load and an actual output 12 of a generator, and the detected values are input into a control device 8.

In addition, similarly to the conventional art, a differential pressure 15 between the upstream point and the downstream point of the flow rate control valve 7 ("flow rate control valve differential pressure") is input into the control device 8. A target value 16 of the flow rate control valve differential pressure is also input into the control device 8. The control device 8 performs desired arithmetic operation based on the input values 9, 10, 12, 14, 15, and 16 and outputs a lift instruction 17 for the pressure control valve 6.

Figure 2A:
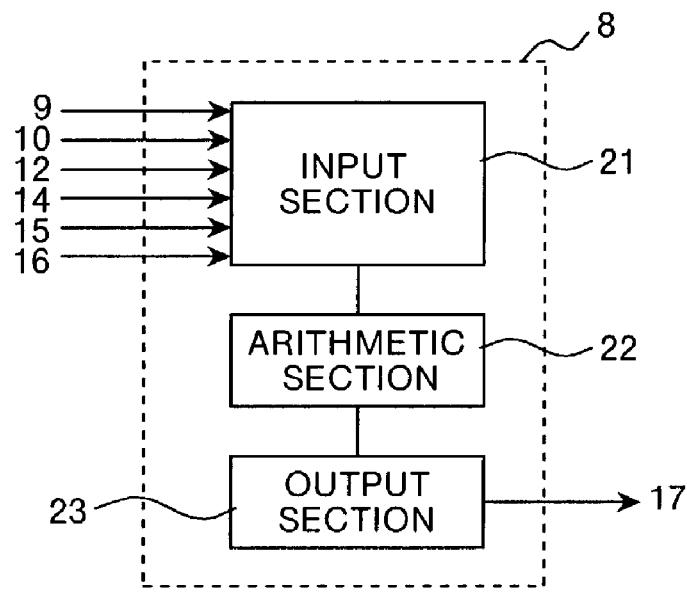
Figure 2B:
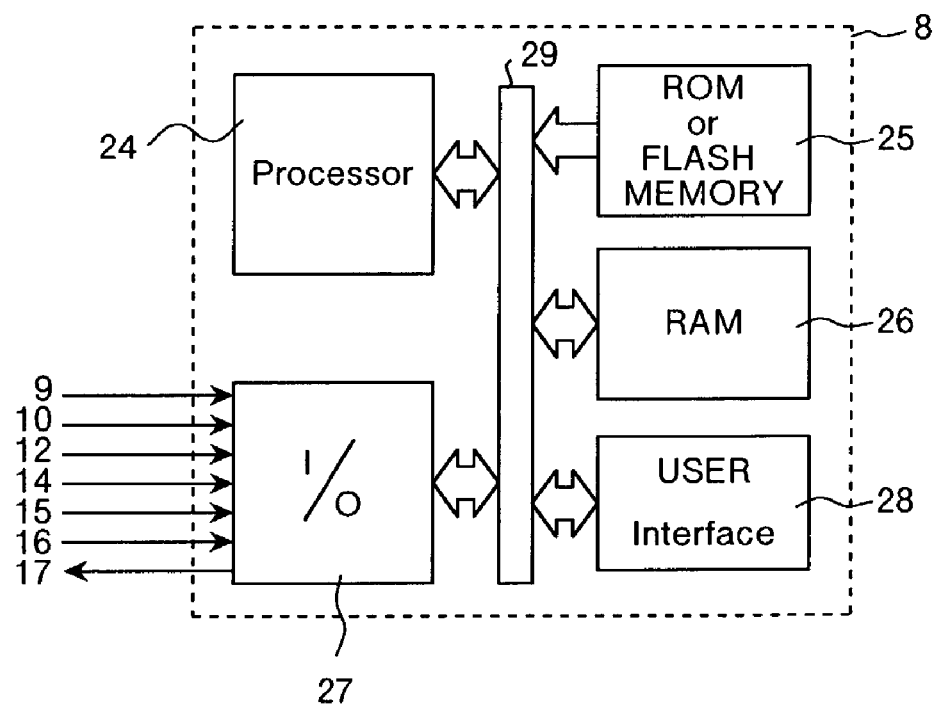

FIG. 2A and FIG. 2B are explanatory views which explain the control device. FIG. 2A is a functional block diagram of the control device 8 and FIG. 2B is a block diagram showing the hardware of the control device 8. As shown in FIG. 2A, the control device 8 includes an input section 21, an arithmetic section 22, and an output section 23. The control device 8 may be also provided with a user interface section such as a monitor for maintenance or the like. The values 10, 12, 14, 15, and 16 such as the fuel gas supply pressure 9 are input, as electrical signals, into the input section 21.

The arithmetic section 22 performs an arithmetic operation to be explained later based on the electrical signals which are input into the input section 21. The output section 23 outputs, as an electrical signal, the lift instruction 17 for the pressure control valve which is derived by the arithmetic section 22. Since the arithmetic section 22 includes a storage section, the arithmetic section 22 performs an arithmetic processing by reading and writing data to and from the storage section.

As shown in FIG. 2B, the hardware of the control device 8 is configured by a processor 24, a ROM 25, a RAM 26, an input-output interface (I/O) 27, and a user interface 28 connected to one another by a bus 29. More specifically, the processor 24 is a central processing unit (CPU) or a digital signal processor (DSP) that serves as a complex instruction set computer (CISC) or as a reduced instruction set computer (RISC).

A program to be executed on the processor 24 is stored in the ROM or a flash memory 25 or the like in advance. This ROM or the like 25 also stores a communication program for communicating with the input-output interface 27 and a program for inputting and outputting data to and from the user interface 28. Although not shown, the input-output interface is provided with an A/D converter or a D/A converter depending on devices (a solenoid valve, various sensors, and the like) which are connected thereto. While the processor 8 has been explained based on a digital processing using software, the program may be realized by an analog processing using hardware.

A method of obtaining a lift amount of the pressure control valve will be explained below. More specifically, this method is executed by using values of the fuel gas supply pressure 9 which is detected upstream of the pressure control valve 6, the combustor casing pressure 10 of the gas turbine 1, the output 12 of the generator which is connected to the gas turbine 1, and the controlled output 14 for the flow rate control valve 7 which is operated based on the difference between the generator load target value 13 and the actual output 12 of the generator 2.

In order to simplify the following explanation, symbols as follows are used. Symbol V denotes a mass flow rate (kg/h) of fuel flowing into the gas turbine, ρ denotes specific gravity (kg/m$^3$) of gas turbine fuel, MW denotes an output of the gas turbine generator (actual generator load) (MW), Cvp denotes a Cv value as a conductance of the pressure control valve 6, Cvt denotes a Cv value as a conductance of the flow rate control valve, Lp denotes a lift amount of the pressure control valve, and Lt denotes a lift amount of the flow rate control valve. In addition, symbol p1 denotes the fuel gas supply pressure, p2 denotes the combustor casing pressure, Δpp denotes a differential pressure across the pressure control valve, Δpt denotes the flow rate control valve differential pressure, and CSO (Controlled Signal Output) denotes a controlled output for the flow rate control valve obtained through operation based on the difference between the output target value of the generator and the output of the actual generator.

If the quantity of heat contained in the fuel is constant, the gas turbine generator output MW and the gas turbine inflow fuel mass flow rate hold the relationship of a function obtained by heat balance. Assuming that this function is $f_{MW}$, the following equation is given.

$$MW = f_{MW}(V) \quad (1)$$

This function $f_{MW}$ is specified by a first-order lag function related to dynamic behavior. Conversely, to obtain the gas turbine inflow fuel mass flow rate from the gas turbine generator output, the following equation (1)' is given.

$$V = f_{MW}^{-1}(MW) \quad (1)'$$

Accordingly, the function $f_{MW}^{-1}$ becomes a first-order progress function related to the dynamic behavior.

The fuel is controlled by the temperature control valve. Therefore, assuming that temperature is constant, the specific gravity ρ is proportional to the supply pressure and can be specified as follows, where Kp is a proportional constant.

$$\rho = K_P \cdot p1 \quad (2)$$

Each equation as follows holds among the Cv value, mass flow rate, specific gravity, and differential pressure with respect to both the pressure control valve and the flow rate control valve.

$$Cvp = V \cdot (\sqrt{\rho})/(\sqrt{\Delta pp}) \quad (3)$$

$$Cvt = V \cdot (\sqrt{\rho})/(\sqrt{\Delta pt}) \quad (3)'$$

Since the flow rate control valve operates based on the CSO, the CSO and the Cv value of the flow rate control valve hold the relationship of a function. If this relationship is expressed as a function $f_{CSO}$, the following equation is given.

$$Cvt = f_{CSO}(CSO) \quad (4)$$

This function $f_{CSO}$ is specified by a first-order lag function related to dynamic behavior.

The following relationship holds among the fuel gas supply pressure, the combustor casing pressure, the pressure control valve differential pressure, and the flow rate control valve differential pressure.

$$p1 = p2 + \Delta pp + \Delta pt \quad (5)$$

Each of the pressure control valve and the flow rate control valve has a function between the Cv value and lift (Lp or Lt) specific to each valve. Assuming that the functions of these valves are fp and ft, the following equations are satisfied, respectively.

$$Lp = fp(Cvp) \quad (6)$$

$$Lt = ft(Cvt) \quad (6)'$$

From the equations (1)', (2), and (3)', Cvt as the Cv value of the flow rate control valve is expressed as follows.

$$Cvt = \{f_{MW}^{-1}(MW)\} \cdot \sqrt{(K_P \cdot p1)}/\sqrt{\Delta pt} \quad (7)$$

From the equation (7), Δpt is expressed as follows.

$$\Delta pt = \{f_{MW}^{-1}(MW)\}^2 \cdot (K_P \cdot p1)/Cvt^2 \quad (8)$$

From the equations (4) and (8), Δpt is also expressed as follows.

$$\Delta pt = \{f_{MW}^{-1}(MW)\}^2 \cdot (K_P \cdot p1)/\{f_{CSO}(CSO)\}^2 \quad (9)$$

From the equations (5) and (9), the pressure control valve differential pressure Δpp is expressed as follows.

$$\Delta pp = p1 - p2 - \{f_{MW}^{-1}(MW)\}^2 \cdot (K_P \cdot p1)/\{f_{CSO}(CSO)\}^2 \quad (10)$$

Accordingly, Cvp as the Cv value of the pressure control valve is expressed as follows.

$$Cvp = \frac{f_{MW}^{-1}(MW)\sqrt{K_P \cdot p1}}{\sqrt{p1 - p2 - \frac{\{f_{MW}^{-1}(MW)\}^2(K_P \cdot p1)}{\{f_{CSO}(CSO)\}^2}}} \quad (11)$$

In addition, from the equation (6), the lift amount Lp of the pressure control valve 6 is expressed as follows.

$$Lp = fp\left[\frac{f_{MW}^{-1}(MW)\sqrt{K_P \cdot p1}}{\sqrt{p1 - p2 - \frac{\{f_{MW}^{-1}(MW)\}^2(K_P \cdot p1)}{\{f_{CSO}(CSO)\}^2}}}\right] \quad (12)$$

If Lp thus obtained is Lp1 ("additional lift amount" in claims) and a lift amount obtained by the feedback control using a conventional differential pressure across the flow rate control valve is Lp2, then the final lift amount Lps of the pressure control valve is given as Lps=Lp1+Lp2. Accordingly, it is possible to obtain Lps using the fuel gas supply pressure p1, the combustor casing pressure p2, the output MW of the generator, the controlled output CSO for the flow rate control valve which is operated based on the difference between the generator output target value and the actual generator output, and on the flow rate control valve differential pressure and the target value thereof.

FIG. 3 is a flowchart which shows the method of controlling the pressure control valve. First to fourth steps indicate steps S101 to S104 at which the fuel gas supply pressure p1, the combustor casing pressure p2, the generator output MW, the controlled output CSO for the flow rate control valve which is operated based on the difference between the generator output target value and the actual generator output are detected. The detected values are input from the I/O which is the input section of the control device 8.

The arithmetic section 22 converts and derives the gas turbine inflow fuel mass flow rate V based on the generator output MW value using the equation (1)' (step S105). The arithmetic section 22 then converts and derives the fuel specific gravity ρ based on the value of the fuel gas supply pressure p1 using the equation (2) (step S106). The value of the controlled output CSO for the flow rate control valve 7 which is operated based on the derived V and ρ and the difference between the generator output target value and the actual generator output, is used to derive the flow rate control valve differential pressure Δpt from the equation (9) (step S107).

The arithmetic section 22 derives the pressure control valve differential pressure Δpp using the fuel gas supply pressure p1, the combustor casing pressure p2, and the flow rate control valve differential pressure Δpt obtained as explained above (step S108). These values are converted to the Cvp value of the pressure control valve from the equation (11) (step S109) and the lift amount Lp1 is derived from the equation (6) (step S110). The final lift amount Lps used to control the pressure control valve is derived by adding the lift amount Lp2 obtained by the conventional feedback control, to the lift amount Lp1 (steps S111 and S112).

Through these steps, the finally obtained lift amount of the pressure control valve is output from the output section of the control device to the pressure control valve. These steps are repeated at a sampling rate which is specified by the control device to continuously output an appropriate lift amount of the pressure control valve (step S113). The steps can be embodied by a program as software. The control device exercises the control.

Figure 4:
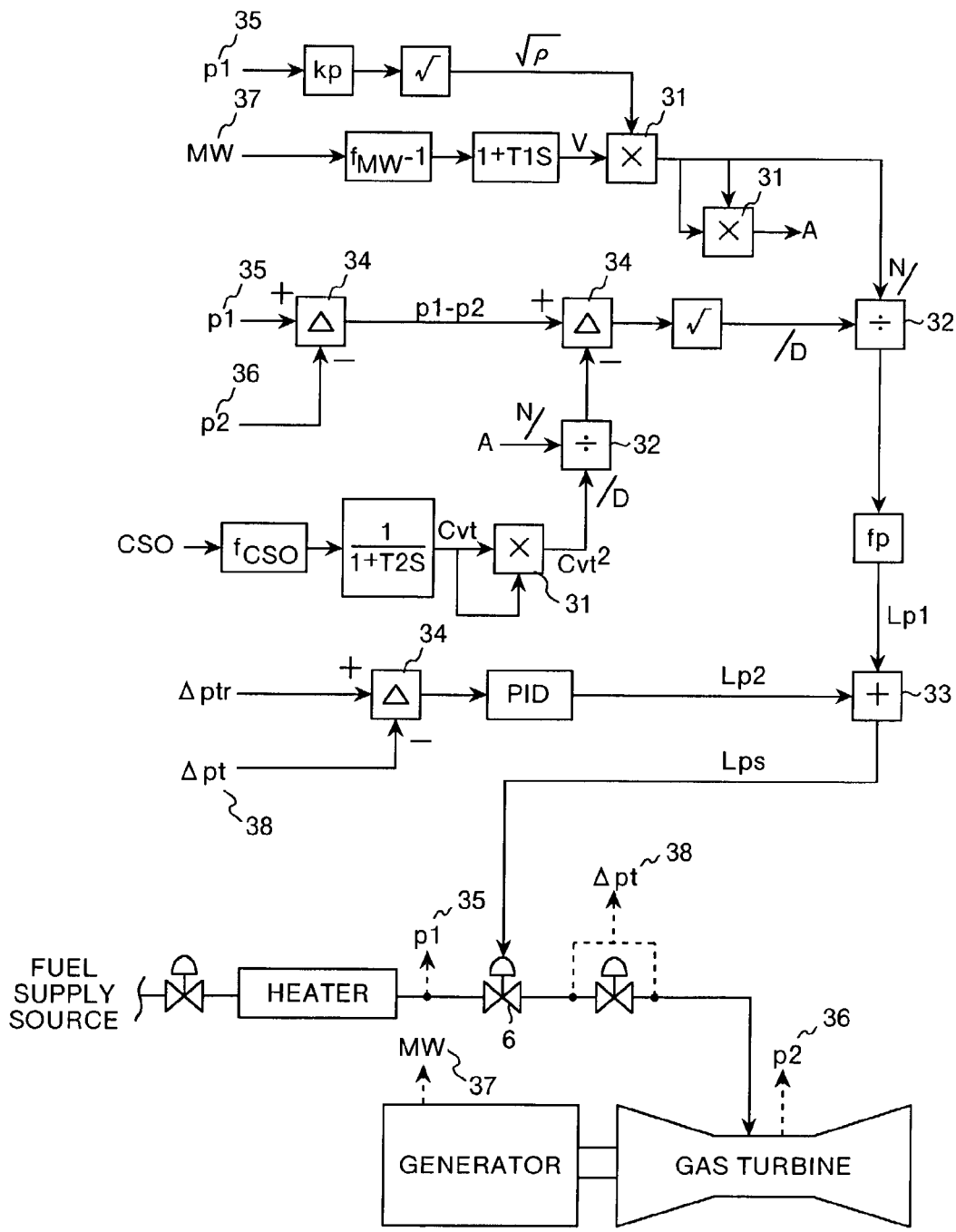
FIG. 4 is a block diagram which shows a process from the input to the output.
Figure 5:
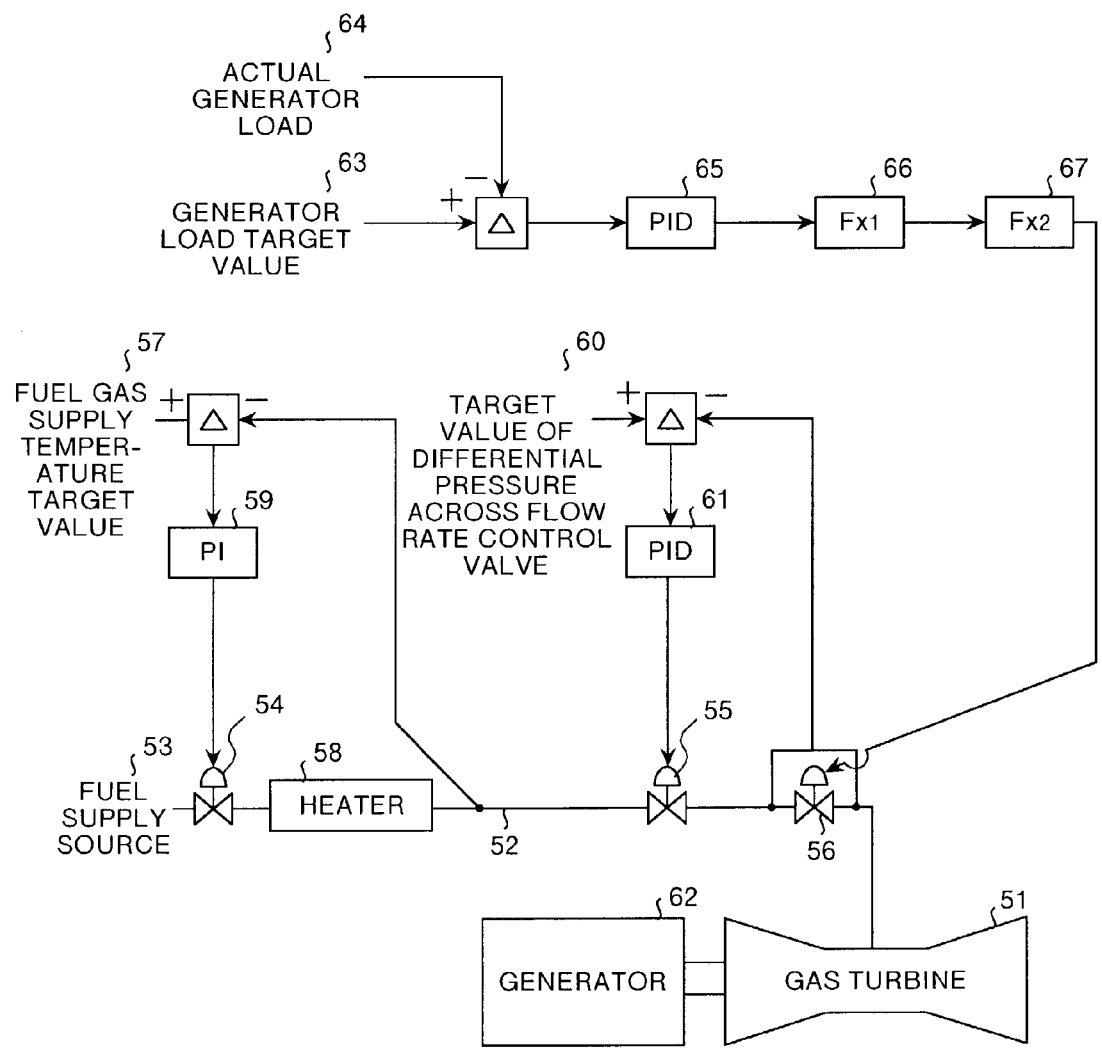
FIG. 5 is a block diagram that shows a conventional method of controlling fuel for a gas turbine.

FIG. 4 is a block diagram which shows the steps from the input to the output explained above. This block diagram is a combination of blocks formed out of the equation (12) and those of the conventional feedback control. In FIG. 4, reference symbol ×31 denotes a multiplier, ÷32 denotes a divider, +33 denotes an adder, and Δ34 denotes a subtracter. The two inputs input into the divider are a divided side (N/) and a dividing side (/D), respectively. The fuel gas supply pressure p1 (denoted by reference symbol 35), the combustor casing pressure p2 (denoted by reference symbol 36), the generator output MW (denoted by reference symbol 37), and the flow rate control valve differential pressure Δpt (denoted by reference symbol 38) are shown apart from the corresponding constituent elements, but they belong to the corresponding elements.

According to the method explained so far, even if the fuel gas supply pressure p1 increases, the pressure control valve can be swiftly closed, and therefore an increase in the flow rate control valve differential pressure Δpt (an increase in the upstream side) can be prevented. Conversely, even if the fuel gas supply pressure p1 decreases, the pressure control valve can be swiftly opened and a decrease in the flow rate control valve differential pressure Δpt (a decrease in the upstream-side) can be thereby prevented. As a result, even if the fuel gas supply pressure cyclically changes, it is possible to minimize the change in the flow rate control valve differential pressure Δpt and to prevent the combustion of the combustor from becoming unstable due to the change in the fuel gas supply pressure.

If the generator output (load) MW rapidly falls, a flow of a signal for which the function $f_{MW}^{-1}(MW)$ is used is influenced on the lift of the pressure control valve quicker than a flow of a signal for which the function $f_{CSO}$ (CSO) is used. This is because the function $f_{MW}^{-1}$ (MW) is a time progress function and the function $f_{CSO}(CSO)$ is a time lag function. As a result, the pressure control valve is closed swiftly, making it possible to prevent the flow rate control valve differential pressure from decreasing.

After a while, the value of the signal for which the function $f_{CSO}$ (CSO) is used gradually decreases (to actually close the flow rate control valve of fuel gas). Therefore, the pressure control valve is opened, and the flow rate control valve differential pressure is eventually fed back to the pressure control valve. Accordingly, even if the generator output suddenly falls, it is possible to minimize the change in the flow rate control valve differential pressure and to thereby prevent the combustion of the combustor from becoming unstable due to the sudden fall of the generator output.

As explained so far, according to the gas turbine fuel control method as one aspect of the present invention, even if the gas supply pressure changes, it is possible to swiftly open and close the pressure control valve and to prevent a change in the flow rate control valve differential pressure. It is thereby possible to prevent the combustion of the combustor from becoming unstable due to the change in the fuel gas supply pressure.

Even if the generator output (load) MW suddenly falls, it is possible to maintain an appropriate signal flow through the action of the time progress and time lag compensation of the functions to be used. It is thereby possible to swiftly close the pressure control valve and to prevent an increase in the flow rate control valve differential pressure. Therefore, even if the generator output suddenly falls, it is possible to prevent the combustion of the combustor from becoming unstable due to the sudden fall of the generator output.

According to the program as another aspect of the present invention, it is possible to execute the gas turbine fuel control method using a hardware resource as a computer. It is thereby possible to establish a control system resisting changes in the fuel gas supply pressure and the generator output.

According to the gas turbine fuel control device as still another aspect of the present invention, even if the gas supply pressure changes, it is possible to swiftly open and close the pressure control valve and to prevent a change in the flow rate control valve differential pressure. It is thereby possible to prevent the combustion of the combustor from becoming unstable due to the change in the fuel gas supply pressure.

Even if the generator output (load) MW suddenly falls, it is possible to maintain an appropriate signal flow through the action of the time progress and time lag compensation of the functions to be used. It is thereby possible to swiftly close the pressure control valve and to prevent an increase in the flow rate control valve differential pressure. Therefore, even if the generator output suddenly falls, it is possible to prevent the combustion of the combustor from becoming unstable due to the sudden fall of the generator output.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gas turbine fuel control method of controlling a lift amount of a pressure control valve provided at a piping in which fuel for a gas turbine flows, by feeding back an actually obtained differential pressure across a flow rate control valve also provided at the piping to the pressure control valve and making the differential pressure follow a desired target value of the differential pressure, the gas turbine fuel control method comprising:
   expressing a conductance of the pressure control valve using
      a pressure used to supply fuel gas that is detected upstream of the pressure control valve at the piping,
      a pressure in a combustor casing of the gas turbine,
      an output of a generator connected to the gas turbine, and
      a controlled output for the flow rate control valve that is calculated based on a difference between an output target value of the generator and an actual output of the generator;
   obtaining an additional lift amount of the pressure control valve from a relationship between the conductance of the pressure control valve and lift; and
   adding the additional lift amount to the lift amount.

2. A gas turbine fuel control method of controlling a lift amount of a pressure control valve provided at a piping in which fuel for a gas turbine flows, by feeding back an actually obtained differential pressure across a flow rate control valve also provided at the piping to the pressure control valve and making the differential pressure follow a desired target value of the differential pressure, the gas turbine fuel control method comprising:
   obtaining a mass flow rate of inflow fuel to the gas turbine that is derived from a relationship with an output of a generator connected to the gas turbine;
   obtaining density of the fuel by multiplying a pressure for fuel gas supply detected upstream of the pressure control valve by a proportional constant for a relationship between the pressure of the fuel gas supply and the density of the fuel;
   obtaining the differential pressure across the flow rate control valve by multiplying a square of the mass flow rate by the density of the fuel to obtain a product, and dividing the product by a square of a conductance of the flow rate control valve which is obtained from a controlled output for the flow rate control valve using a function between the controlled output for the flow rate control valve and the conductance of the flow rate control valve, the controlled output being calculated based on a difference between an output target value of the generator and an actual output of the generator;
   obtaining a conductance of the pressure control valve by dividing a product between the mass flow rate and a square root of the fuel density, by a square root of a differential pressure across the pressure control valve, the square root of the differential pressure being expressed by subtracting a pressure in a combustor casing of the gas turbine from the pressure for the fuel gas supply to obtain a pressure and further subtracting the differential pressure from the obtained pressure;
   determining an additional lift amount of the pressure control valve using a function between the conductance of the pressure control valve and lift; and
   adding the additional lift amount to the lift amount.

3. The gas turbine fuel control method according to claim 2, wherein the mass flow rate of inflow fuel to the gas turbine is expressed by a first-order progress function of an output of the generator connected to the gas turbine, and the conductance of the flow rate control valve is expressed by a first-order lag function of the controlled output for the flow rate control valve.

* * * * *